(12) United States Patent
Yap et al.

(10) Patent No.: US 6,557,768 B2
(45) Date of Patent: May 6, 2003

(54) METHOD FOR SELF-PROGRAMMING SMART CARDS

(75) Inventors: Sue-Ken Yap, Lane Cove (AU); William Simpson-Young, Eastwood (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/845,295

(22) Filed: May 1, 2001

(65) Prior Publication Data

US 2001/0048024 A1 Dec. 6, 2001

(30) Foreign Application Priority Data

May 4, 2000 (AU) ............................................. PQ7306

(51) Int. Cl.[7] .............................................. G06F 19/06
(52) U.S. Cl. ....................................... 235/492; 235/379
(58) Field of Search .................................. 235/379, 492

(56) References Cited

U.S. PATENT DOCUMENTS 4,992,651 A * 2/1991 Takahira ..................... 235/492

FOREIGN PATENT DOCUMENTS

| AU | 199953527 A1 | 4/2000 |
| JP | 61-156491 | * 7/1986 |

* cited by examiner

*Primary Examiner*—Harold I. Pitts
(74) *Attorney, Agent, or Firm*—Fitzpatrick, Cella, Harper & Scinto

(57) ABSTRACT

A method is described whereby a user may interact with control indicia (22, 24) of a smartcard (10) to modify data stored in a volatile portion of a memory chip (19). A possible source of data may be from the smartcard 10 itself, whereby an incident where a region on a pressure sensitive membrane (8) of a controller (2) associated with a specific index (22, 24) has been pressed is stored on the memory chip (19). This enables the occurrence of this incident to be extracted later. Another possible source of the data is a software application, running on a computer. A user may save a state of the application, enabling the user to return to that state of the application later by activation of a region on the pressure sensitive membrane (8) associated with the same control index (22, 24).

20 Claims, 6 Drawing Sheets

METHOD FOR SELF-PROGRAMMING SMART CARDS

TECHNICAL FIELD OF THE INVENTION

The present invention relates to the use of a smartcard as a user interface and storage device for information, and in particular, to a method of programming the smartcard.

The invention has been developed primarily for use with remote control systems, and will be described hereinafter with reference to this application. However, it will be appreciated that the invention is not limited to that field of use.

BACKGROUND ART

Control pads of various types are known and used across a relatively wide variety of fields. Typically, such pads include one or more keys, buttons or pressure responsive areas which, upon application of suitable pressure by a user, generate a signal which is supplied to associated control circuitry.

Unfortunately, prior art control pads are somewhat limited, in that they only allow for a single configuration of keys, buttons or pressure sensitive areas. However, standard layouts rarely exist in a given field. Thus, a user is frequently compelled to learn a new layout with each control pad they use. For example many automatic teller machines ("ATMs") and electronic funds transfer at point of sale ("EFTPOS") devices use different layouts, notwithstanding their relatively similar data entry requirements. This can be potentially confusing for a user who must determine for each control pad the location of buttons required to be depressed. The problem is exacerbated by the fact that such control pads frequently offer more options than the user is interested in, or even able to use.

Overlay templates for computer keyboards and the like are known. However they are relatively inflexible in design terms and require a user to correctly configure the system with which the keyboard is associated, each time the overlay is to be used.

FIGS. 1A and 1B show a prior art system 1 using a control template in the form of a smartcard 10 as an interface system. The smartcard 10 includes a storage means in the form of an on-board memory chip 19 for storing mapping data associated with control indicia, such as indicia 22 and 24 printed on a laminar substrate 12.

The smartcard 10 also includes data contacts 18, visible on the back view of the smartcard 10 and shown in FIG. 2. The data contacts 18 are electrically connected to the on-board memory chip 19.

In use, the smartcard 10 is inserted into a controller 2, and in particular into a template receptacle 4 of the controller 2. The controller 2 also includes a viewing area 6 through which the inserted smartcard 10 is visible. A sensor means in the form of a substantially transparent pressure sensitive membrane 8 is also provided, covering the viewing area 6. In use the pressure sensitive membrane 8 covers the upper face 16 of the smartcard 10, allowing the control indicia to be visible.

Data reading means is provided in the form of exposed contacts 7 and associated control circuitry (not shown). The exposed contacts 7 are arranged to contact with the data contacts 18 of the smartcard 10.

The exposed contacts 7 and associated circuitry are configured to read the mapping data associated with the control indicia from the memory chip 19, either automatically upon insertion of the smartcard 10 into the control template receptacle 4, or selectively in response to a signal from the controller 1. This signal can, for example, be transmitted to the smartcard 10 via the exposed contacts 7 and data contacts 18.

Once the mapping data associated with the control indicia 14 has been read, a user can press areas of the pressure sensitive membrane 8 on or adjacent to the underlying control indicia 22 and 24. By sensing the pressure on the pressure sensitive membrane 8 and referring to the mapping data, the controller 1 can deduce which of the control indicia 22 or 24 the user has pressed.

However, this prior art arrangement has the disadvantage that it has to be programmed using external devices, such as a computer (not illustrated). In such a system, the computer sends data through a cable to a device which stores that data on the smartcard 10. Such a device may form a part of a card printer and the card programming may occur on the same occasion as the printing on the smartcard 10.

Low cost manual data capture artefacts, which do not require relatively high-cost data input devices are also available. These include fill-in forms and punch cards. In the case of punch cards, a paper card is punched with holes and read using an optical reader. Paper forms also exists with regions that can be blacked with a pencil and scanned with an optical reader. However, these systems suffer from various disadvantages, including very low data storage-capacity. Another is the cost associated with converting the data to machine-readable format, requiring relatively high-cost transducers in the form of optical detectors. Yet another is the inability or inconvenience associated with correcting or changing entry errors.

DISCLOSURE OF THE INVENTION

It is an object of the present invention to overcome or at least substantially ameliorate one or more of the disadvantages of the prior art.

According to a first aspect of the invention, there is provided a method of programming data into a memory of an electronic card, said electronic card having a substrate with at least a first index, wherein said electronic card is inserted in an electronic card interface having a substantially transparent surface through which said first index of said electronic card is visible, said method comprising the steps of:

detecting a user interaction with an area on said surface associated with said first index; and writing data into said memory, said data prescribing a function associated with said first index upon subsequent interaction with said area on said surface associated with said first index.

According to a second aspect of the invention, there is provided a method of programming data into a memory of an electronic card, said electronic card having a substrate with at least a first index, wherein said electronic card is inserted in an electronic card interface having a substantially transparent surface through which said first index of said electronic card is visible, said method comprising the steps of:

detecting a user interaction with an area on said surface associated with said first index; and writing data into said memory, said data recording an occurrence of said user interaction with said first index.

According to a third aspect of the invention, there is provided a method of programming data into a memory of an electronic card, said electronic card having a substrate with at least a first index, wherein said electronic card is inserted in an electronic card interface having a substantially transparent surface through which said first index of said electronic card is visible, said method comprising the steps of:

detecting a user interaction with an area on said surface associated with said first index; and writing data into said memory, said data recording a current context of use at an instance of said user interaction with said first index.

According to another aspect of the invention, there is provided an electronic card comprising a substrate with at least a first index and a memory, wherein said electronic card is inserted in an electronic card interface having a substantially transparent surface through which said first index of said electronic card is visible, and means for detecting a user interaction with an area on said surface associated with said first index; said memory comprising:

code for writing data into said memory, said data prescribing a function associated with said first index upon subsequent interaction with said area on said surface associated with said first index.

According to another aspect of the invention, there is provided an electronic card comprising a substrate with at least a first index and a memory, wherein said electronic card is inserted in an electronic card interface having a substantially transparent surface through which said first index of said electronic card is visible, and means for detecting a user interaction with an area on said surface associated with said first index; said memory comprising:

code for writing data into said memory, said data recording an occurrence of said user interaction with said first index.

According to another aspect of the invention, there is provided an electronic card comprising a substrate with at least a first index and a memory, wherein said electronic card is inserted in an electronic card interface having a substantially transparent surface through which said first index of said electronic card is visible, and means for detecting a user interaction with an area on said surface associated with said first index; said memory comprising:

code for writing data into said memory, said data recording a current context of use at an instance of said user interaction with said first index.

According to another aspect of the invention, there is provided an electronic card system comprising:

an information appliance;

an electronic card comprising a substrate with at least a first index and a memory; and an electronic card interface in communication with said information appliance and for receiving said electronic card, said electronic card interface comprising:

a substantially transparent surface through which said first index of said electronic card is visible;

means for detecting a user interaction with an area on said surface associated with said first index; and means for writing data into said memory, said data prescribing a function performed by said information appliance and associated with said first index upon subsequent interaction with said area on said surface associated with said first index.

According to another aspect of the invention, there is provided an electronic card system comprising:

an electronic card comprising a substrate with at least a first index and a memory; and an electronic card interface for receiving said electronic card, said electronic card interface comprising:

a substantially transparent surface through which said first index of said electronic card is visible;

means for detecting a user interaction with all area on said surface associated with said first index; and means for writing data into said memory, said data recording all occurrence of to said user interaction with said first index.

According to yet another aspect of the invention, there is provided an electronic card comprising a substrate with at least a first index and a memory, wherein said electronic card is inserted in an electronic card interface having a substantially transparent surface through which said first index of said electronic card is visible, and means for detecting a user interaction with an area on said surface associated with said first index; said memory comprising:

code for writing data into said memory, said data prescribing a function associated with said first index upon subsequent interaction with said area on said surface associated with said first index.

BRIEF DESCRIPTION OF THE DRAWINGS

One or more embodiments of the invention will now be described, by way of example only, with reference to the accompanying drawings, in which.

DETAILED DESCRIPTION INCLUDING BEST MODE

Figure 1A:
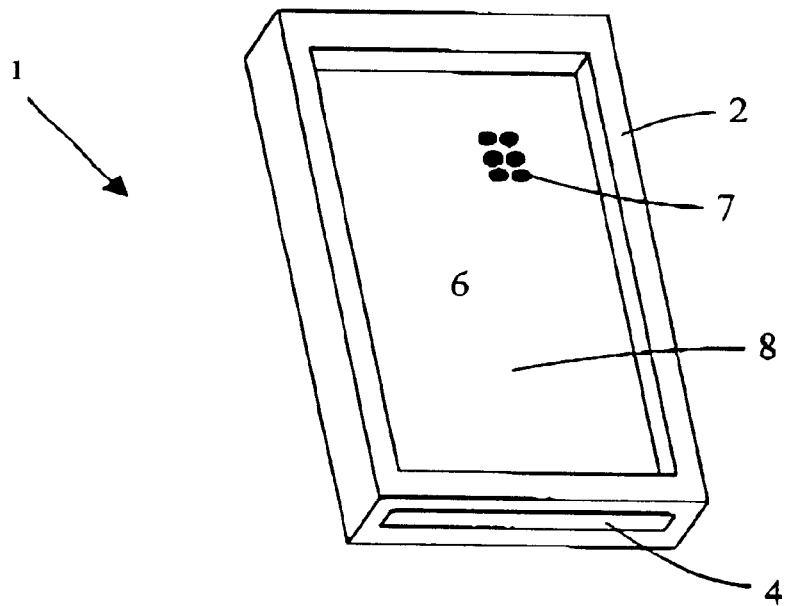
FIGS. 1A and 1B are perspective views of a controller and associated control template upon which an embodiment of the invention may be practiced.
Figure 1B:
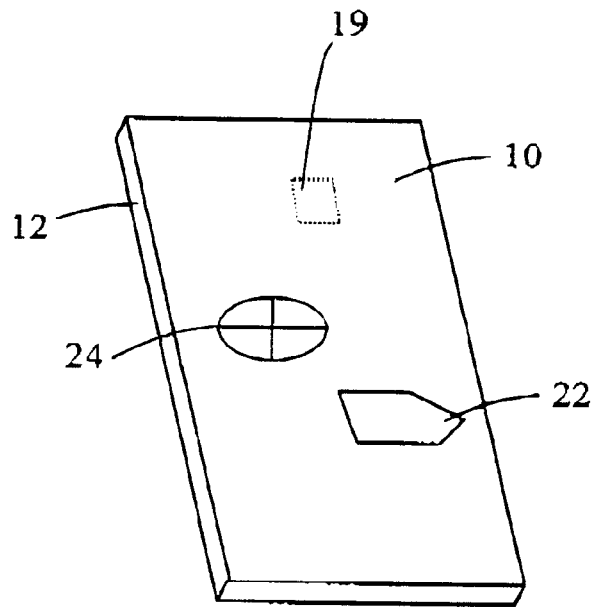

The controller 2 and smartcard 10 shown in FIGS. 1A and 1B may be used to implement a preferred embodiment of the invention. The smartcard 10, having control indicia 22 and 24, is inserted into the template receptacle 4 of the controller 2. The exposed contacts 7 and associated circuitry reads the mapping data and instruction set associated with the control indicia 22 and 24 from a non-volatile portion of the memory chip 19. By interacting with the indicia 22 and 24, the user activates an associated region on the pressure sensitive membrane 8.

A user may press areas of the pressure sensitive membrane 8 on or adjacent to the underlying control indicia 22 and 24. The controller 2 senses the pressure on the pressure sensitive membrane 8. By referring to the mapping data stored in the memory chip 19, the controller 1 can deduce which of the control indicia 22 or 24 the user has pressed and perform an associated function.

Figure 1C:
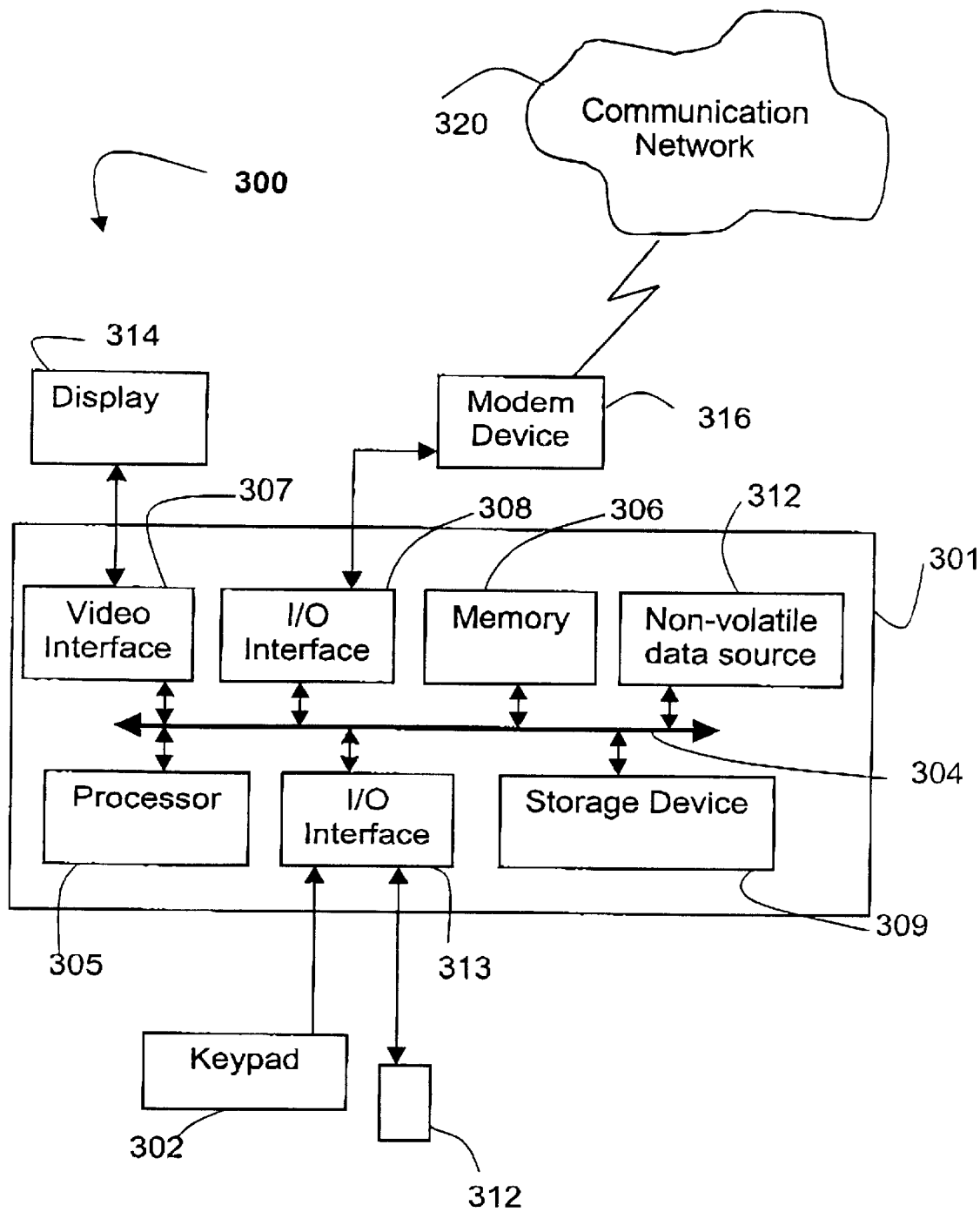
FIG. 1C is a schematic block diagram of a remote controller.
Figure 2:
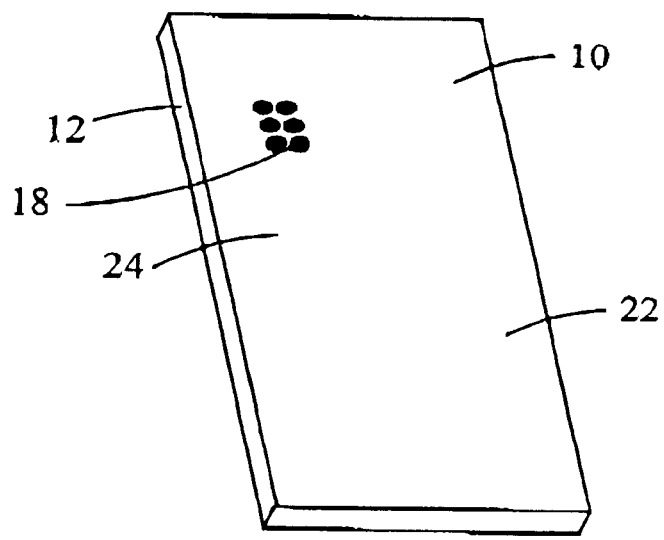
FIG. 2 is a perspective view of an opposite side of the control template shown in FIG. 1B.

The controller 2 typically includes a transceiver, such as an infra-red (IR) transceiver or radio frequency (RF) transceiver (not illustrated), for transmitting information in relation to control indicia 22 and 24 selected by the user to a remote console, such as the remote console 300 shown in FIG. 1C, where a corresponding transceiver 312 detects and decodes the information for use in executing a command associated with the pressed control indicia 22 and 24.

The remote console 300 may be a general purpose computer or other processor based information appliance, such as a set-top box, having an application program executing thereon. In particular, step within the application program are effected by instructions in the software that are carried out by the remote console 300. The software may be stored in a computer readable medium, including the storage devices described below, for example. Alternatively, the software may be loaded into a non-volatile memory portion of the remote console 300 upon manufacture. A computer readable medium having such software or computer program recorded on it is a computer program product.

The remote console 300 comprises a computer module 301, an input device such as a keypad 302, and a display device 314. In the case where the remote console 300 is a set-top box, the display device 314 may be a digital television.

A Modulator-Demodulator (Modem) transceiver device 316 may used by the computer module 301 for communicating to and from a communications network 320. The modem 316 can be used to obtain access to the Internet, and other network systems, such as a Local Area Network (LAN) or a Wide Area Network (WAN).

The computer module 301 typically includes at least one processor unit 305, a memory unit 306, for example formed from semiconductor random access memory (RAM) and read only memory (ROM), input/output (I/O) interfaces including a video interface 307, and an I/O interface 313 for the keypad 302 and transceiver 312, and an interface 308 for the modem 316. A storage device 309 is provided as a source/destination of volatile data, while a non-volatile data source 312 may also be provided. The components 305 to 313 of the computer module 301, typically communicate via an interconnected bus 304 and in a manner which results in a conventional mode of operation of the remote console 300 known to those in the relevant art.

Typically, the application program is resident on the non-volatile data source 312 and read and controlled in its execution by the processor 305. Intermediate storage of the program and any data fetched from the network 320 may be accomplished using the semiconductor memory 306, possibly in concert with the storage device 309. The application program may be supplied to the user encoded on a removable storage device and read via an storage device interface (not illustrated), or alternatively may be read from the network 320 via the modem device 316. Still further, the software can also be loaded into the remote console 300 from other computer readable media. The term "computer readable medium" as used herein refers to any storage or transmission medium that participates in providing instructions and/or data to the remote console 300 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 301. Examples of transmission media include radio or infra-red transmission channels as well as a network connection to another computer or networked device, and the Internet or Intranets including email transmissions and information recorded on websites and the like.

Referring again to FIGS. 1A and 1B, the user may further interact with the control indicia 22 and 24 of the smartcard 10 to modify data stored in a volatile portion of the memory chip 19. The data that is to be stored on the volatile portion of the memory chip may come from any source. Without limiting the scope of the invention, an example of a possible source of data may be from the smartcard 10 itself, whereby an incident where a region on the pressure sensitive membrane 8 associated with a specific index 22 or 24 has been pressed is stored on the memory chip. This enables the occurrence of this incident to be extracted later.

Figure 3A:
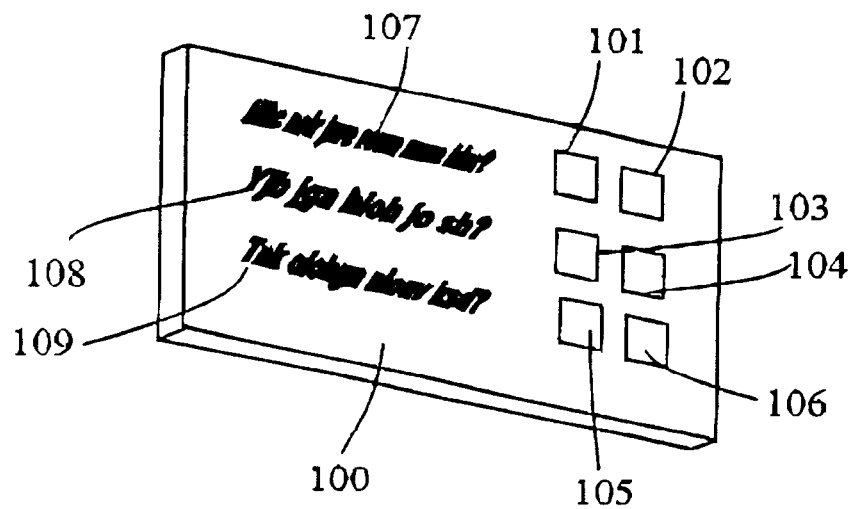
FIG. 3A shows an embodiment of the control template with several questions and icons associated possible answers to the questions imprinted on it.
Figure 3B:
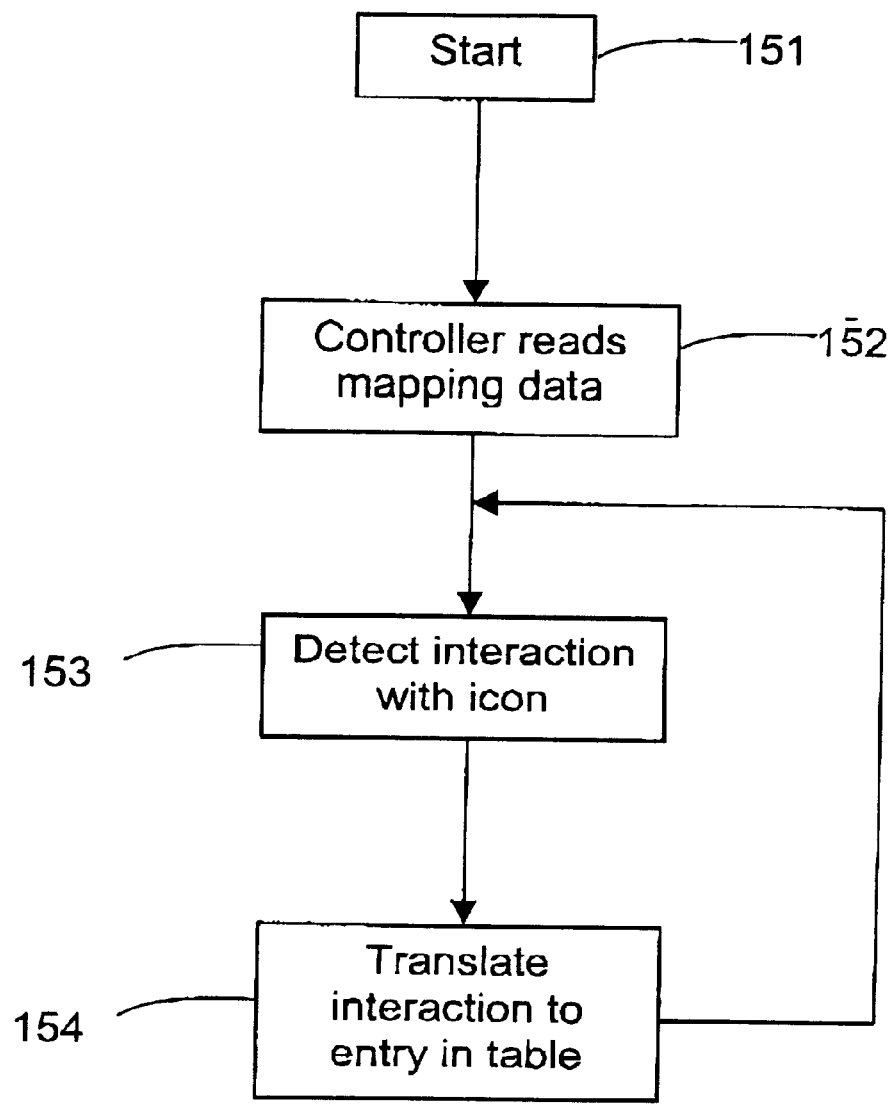
FIG. 3B shows a flow diagram of a method of programming the control template.

As an embodiment of this example, FIG. 3A shows a smartcard 100 with several control indicia in the form of icons 101 through 106 imprinted on it. In this particular embodiment, the icons 101 through 106 relate to a series of questions 107 through 109 that are to be answered by the user The questions 107 through 109 are imprinted on the surface of the smartcard 100 in a manner that they are associated with answers. In turn, the answers are associated with the icons 101 through 106. For the sake of illustration, let us assume that the 3 questions pertain to cable TV viewing habits as follows:

1. Do you watch TV during the day? Yes/No
2. Do you have children under the age of 10 at home? Yes/No
3. Would you subscribe to a children oriented cable TV channel? Yes/No Also referring to FIG. 3B wherein a method 150 of programming the smartcard 100 is shown, the user starts the method 150 in step 151 when the smartcard 100 is inserted into the template receptacle 4 (FIG. 1A) of the controller 2. The exposed contacts 7 (FIG. 1A) and associated circuitry of the controller 2 reads the napping data and instruction set associated with the icons 101 through 106 from the non-volatile portion of the memory chip of smartcard 100 in step 152.

The user answers question 1 by activating a region on the pressure sensitive membrane 8 associated with either icon 101 or 102 for Yes and No responses respectively. Suppose the question is answered with a Yes response by activating a region on the pressure sensitive membrane 8 associated with icon 101. Software running on the control circuitry of the controller 2 detects the interaction with icon 101 in step 153. Step 154 follows where the software of the control circuitry translates this interaction to an entry in a table, translating X-Y coordinates on the pressure sensitive membrane 8 to data. The data associated with that icon 101 is retrieved from the non-volatile portion of the on-board memory chip 19 of the smart card 100. This data comprises a command to be sent to the remote console 300 as well as a portion to be interpreted by the microprocessor of the controller 2 (shown in FIG. 1A).

The command to the base station will cause an appropriate feedback to be displayed on the display 314 of the remote console 300. In this case, it causes the word "Yes" to be displayed on the display area next to the question being answered.

For this example, the data may be in the form of a URL (Uniform Resource Locater) as follows:

http;//www.tv.com.au/survey1.cgi?q1-yes?store-1=1

In the data, the character substring "q1=yes" causes the remote console 300 to highlight the word "Yes", while the character substring "store-1=1" is interpreted by the microprocessor of the controller 2, but causes no action at the remote console 300. Any sufficient distinct character sequence that will not conflict with existing usage on the remote console 300 will suffice.

Figure 3C:
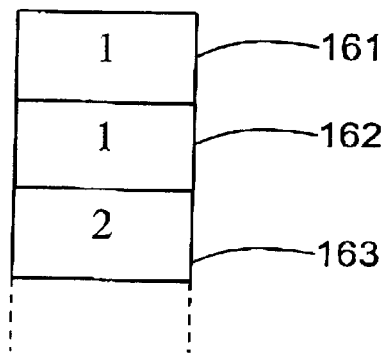
FIG. 3C shows a data table stored in a volatile portion of a memory chip of the control template.

In response to the character string "store-1=1", the controller 2 deposits a "1" character in a portion of the memory chip of smartcard 100 designated to receive answers, such as memory table 160 shown in FIG. 3C. In the example where the user answered the first question with a "Yes" response, resulting in the in character string "store-1=1", the "1" character is written into a first location 161.

A similar process happens when the user answers questions 2 and 3, causing steps 153 and 154 to be repeated. If the second and third questions are answered with a "Yes" and a "No" response respectively by activating a region on the pressure sensitive membrane 8 associated with icons 103 and 106, character strings "store-2=1" and "store-3=2" will result, causing the "1" character to be written into a second location 162 and a "2" character to be written into a third location 163.

After having answered all three questions 107 through 109, three memory locations 161 to 163 on the memory chip of smartcard 100 now hold the user responses. The method 150 is terminated (not illustrated) when the smartcard 100 is removed from the template receptacle 4 of controller 2.

The user may answer questions 107 through 109 more than once, in which case the last answer received will be retained. Optionally, a third value could be used to indicate no answer was received, to indicate "not applicable" or the default answer. For example, the entries in the locations 161 to 163 of the table 161 may be initiated with characters "3". Upon retrieval of the values from the table, all locations 161 to 163 with the value "3" entered therein would indicate that the associated question 107 to 109 has not been answered by the user. In a further embodiment, a "clear" icon (not illustrated) is provided, enabling the user to reset the values in the table 160 to a default state.

The smartcards 100 for collecting data is typically returned to a data collection agency (not illustrated) after the questions are answered. The agency would then typically insert the returned smartcards 100 into a smartcard reader/programmer (not illustrated), allowing the values associated with the answers to be read from the table. The smartcard reader/programmer may also program default values into the table 160, allowing the cards to be handed to different users.

Another example of a possible source of the data is a software application, running on the remote console 300. In this example the remote console 300 is preferably a general-purpose computer. The computer is in communication with the controller 2 through the transceiver 312. A user can save a state of the application, enabling the user to return to that state of the application later by activation of a region on the pressure sensitive membrane 8 associated with the same control index 22 or 24. The state of the application may include the current state of a game, a place in a document, a locater for a currently displayed web site on the user's web browser, or a locater for a currently displayed image, such as one available from a web cam or a remote controllable camera.

Another example is where the remote console 300 is a set-top box in communication with a digital television. In this example the data is a Uniform Resource Locator (URL) which identifies a specific page on the World Wide Web, which is displayed on a television screen of the television, or is associated with content displayed on the screen. Upon interaction with the smartcard 10, the controller 2 sends a data request to the set-top box. The set-top box respond with the URL, allowing the controller 2 to write the data into the volatile portion of the smartcard 10. This allows the user to later view the World Wide Web page, for example to obtain more information about a product, or to order the advertised product. The URL could also be broadcast by the set-top box for the duration of the display of the associated content. In this case, interaction with the smartcard 10 by means of the controller 2, results in the writing of the broadcasted URL to the volatile portion of the smartcard 10, such that it is associated with the region of interaction.

Figure 4A:
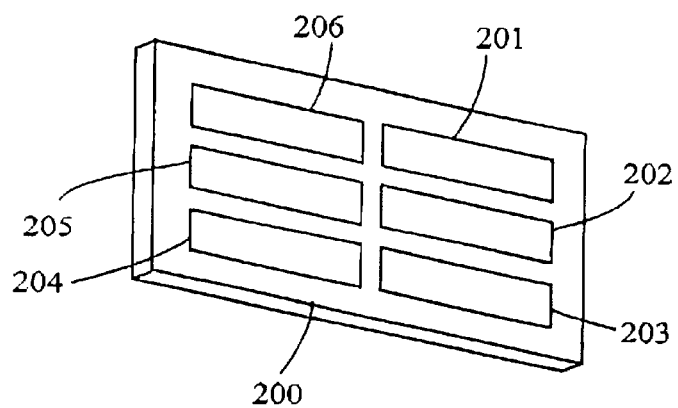
FIG. 4A shows another embodiment of the control template with several initially blank icons used to program user selectable data onto it.
Figure 4B:
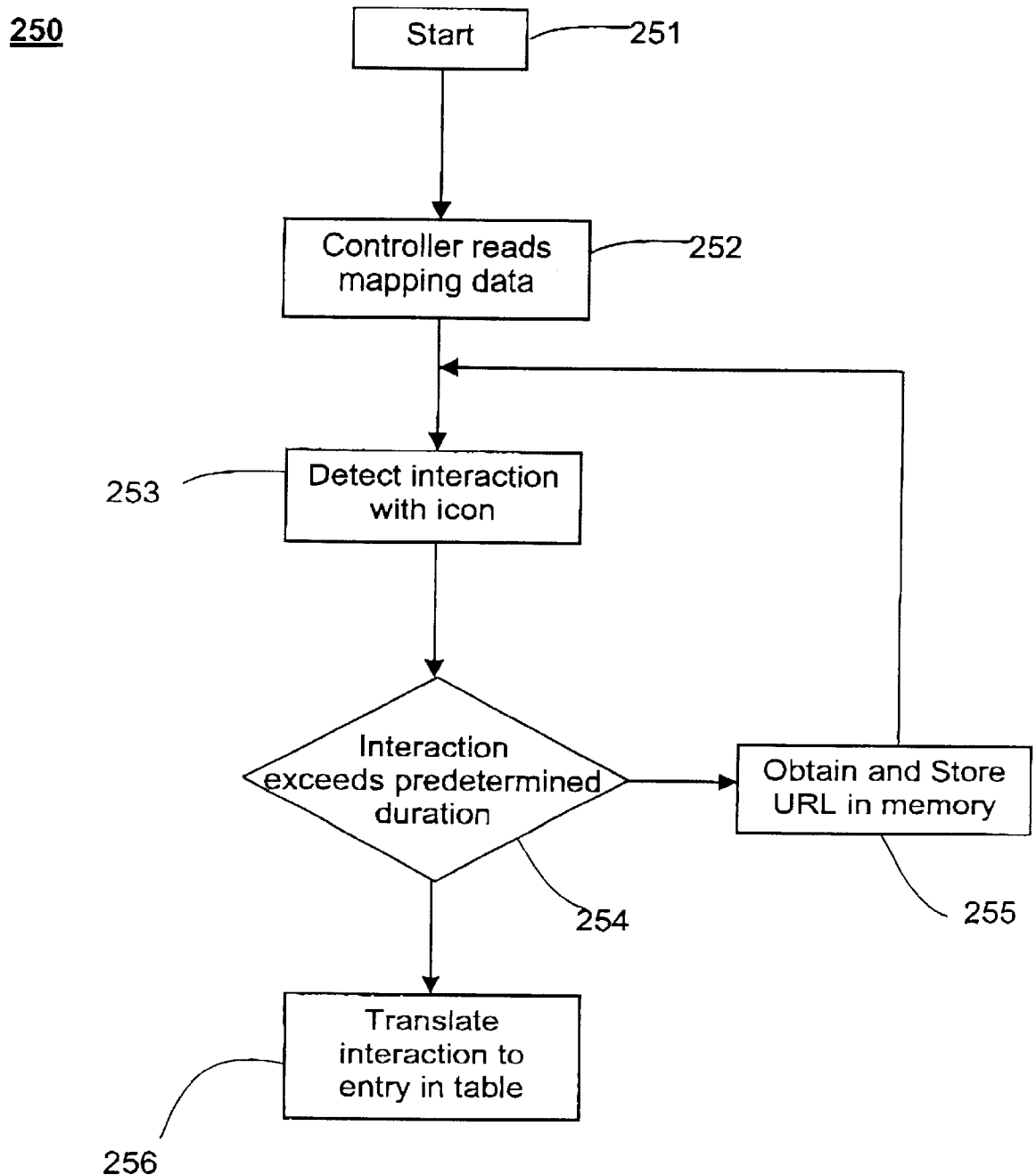
FIG. 4B shows a flow diagram of another method of programming the control template.

As an embodiment of this example, FIG. 4A shows a smartcard 200 with several icons 201 through 206 imprinted on its surface. FIG. 4B shows a method 250 for programming the smartcard 200. A user starts the method 250 in step 251 when the smartcard 100 is inserted into the template receptacle 4 (FIG. 1A) of the controller 2. The exposed contacts 7 (FIG. 1A) and associated circuitry of the controller 2 reads the mapping data associated with the icons 201 through 206 from the memory chip of smartcard 200 in step 252.

In this particular embodiment, the icons 201 through 206 relate to a set of URLs, each of which identifies a specific page on the World Wide Web. When an interaction with one of the icons 201 through 206 is detected in step 253, and the duration of the interaction is determined in step 254 to be less than a predetermined duration, then an application is controlled to display the corresponding web page in step 255. The method 250 returns to step 253 where it waits for a next interaction.

The user may additionally interact with the smartcard 200 to make changes to the data that is stored on the on-board memory chip of the smartcard 200 itself. For example, a user may navigate to a specific web page by some means. If the user wishes to store a reference to the current web location, the user presses an area on the pressure sensitive membrane 8 of the controller 2 associated with one of the icons 201 through 206 for an extended period. Step 254 determines that the interaction was longer than the predetermined duration and the method 250 proceeds to step 256 where the associated URL is retrieved from the remote console 300 and stored on the memory chip of smartcard 200. The controller 2 may respond with some auditory feedback to confirm that the data associated with that icon 201 through 206 has been modified. The user may write on the icon 201 through 206 the URL or a description of the URL. Alternatively, the user may attach a sticker with an individually recognisable symbol or character onto the icon 201 through 206. For example, a sticker with a symbol of a house may be used to indicate that this icon points to the user's homepage. Additionally, a symbol of money may be used to point to the user's favourite stock exchange web site etc.

On subsequent occasions, by interacting with that icon 201 through 206, the user is taken directly to the new location that has been stored. A user would thus be able to store references to favourite web sites on the card 200 and give the cards 200 to others to use.

Another example of a possible source of the data is where the remote console 300 is a controller of a television (not illustrated). The controller is in communication with the controller 2 through the transceiver. A user can save a state of the television, for example the brightness setting, the volume setting or a channel selection, enabling the user to return to that setting later by activation of a region on the pressure sensitive membrane 8 associated with the same icon 201 through 206.

Another example of a possible source of data is another smartcard. A user may insert a first smartcard containing certain information on its memory chip 19, press an area on the pressure sensitive membrane 8 of the controller 2 associated with one of the control indicia 22 or 24 for selecting particular information, replace the first smartcard with a second smartcard 10, and by pressing an area on the pressure sensitive membrane 8 of the controller 2 associated with an control indicia 22 or 24, the user selects a region in the memory chip 19 of the second smartcard 10 where particular information should be stored. This particular information may be retrieved later by again pressing the area on the pressure sensitive membrane 8 of the controller 2 associated with that control indicia 22 or 24.

Yet another example of a possible source of the data is a current context of use at an instance of the interaction. These may include current time, current geographic position of the user and/or the current temperature.

Referring again to FIGS. 1A and 1B, the embodiment of the invention allows the same smartcard 10 to be used for initiating storage of data on the memory chip 19, as well as controlling an application by acting as a user interface. It is therefore necessary for the smartcard 10, and software running on the controller 2, to be able to distinguish between user interaction as a storage command and a control command to an application.

This may be done by having certain of the indicia 22 and 24 pre-defined as being ones that perform data storage commands. This may be done in the memory chip or by the indicia identifier sent to an application. For example, one of the indicia 22 or 24 may be marked as "set temperature" and results in the controller 2 retrieving the current temperature from an interface (not illustrated) and storing the current temperature on the memory chip 19 of the smartcard 10. Another one of the indicia 22 or 24 may be marked "show temperature" and upon activation of an associated region on the pressure sensitive membrane 8, the controller 2 retrieves the stored temperature from the memory chip 19. This retrieved temperature may be communicated to another device, including a computer.

Alternatively, it may be determined whether an interaction with an index 22 or 24 is intended to initiate a data storage command based on the current context in which the smartcard 10 is used. For example, a software application may prompt the user at a certain instance of an operation to "press on the button with which you want this data associated". The next one of the indicia 22 or 24 would be the one with which the stored data is associated.

Another method that may be used to discriminate between possible intentions of the user when interacting with an index 22 or 24 is based on the characteristics of the interaction itself. For example, an index 22 or 24 that is normally used for controlling some aspect of an application may be held down for an extended period in order to initiate a data store command to store data associated with that index 22 or 24. Additionally the user may be given an auditory feedback when data has been stored.

The foregoing describes only some embodiments of the present invention, and modifications and/or changes can be made thereto without departing from the scope of the invention.

We claim:

1. A method of programming data into a memory of an electronic card, the electronic card having a substrate with at least one index, the electronic card being inserted in an electronic card interface having a substantially transparent surface through which the at least one index of the electronic card is visible, said method comprising the steps of:

detecting a user interaction with an area on the surface associated with the at least one index; and writing data into the memory by the electronic card interface in response to the user interaction, the data prescribing a function associated with the at least one index upon subsequent interaction with the area on the surface associated with the at least one index.

2. A method according to claim 1, further comprising:

reading the data from the memory; and performing the function, wherein said reading and performing steps are performed in response to subsequent interaction with the area on the surface associated with the at least one index.

3. A method according to claim 1, wherein the function is directing a computer application in communication with the electronic card interface to a state associated with a state of the application when the user interaction occurred.

4. A method according to claim 1, wherein the function is directing a World Wide Web browser in communication with the electronic card interface to a World Wide Web page associated with data displayed on a screen of an information appliance when the user interaction occurred.

5. A method according to claim 1, wherein the function is returning an information appliance in communication with the electronic card interface to a state of the information appliance when the user interaction occurred.

6. A method of programming data into a memory of an electronic card, the electronic card having a substrate with a least one index, the electronic card being inserted in an electronic card interface having a substantially transparent surface through which the at least one index of the electronic card is visible, said method comprising the steps of:

detecting a user interaction with an area on the surface associated with the at least one index; and writing data into the memory by the electronic card interface in response to the user interaction, the data recording an occurrence of the user interaction with the at least one index.

7. A method of programming data into a memory of an electronic card, the electronic card having a substrate with at least one index, the electronic card being inserted in an electronic card interface having a substantially transparent surface through which the at least one index of the electronic card is visible, said method comprising the steps of:

detecting a user interaction with an area on the surface associated with the at least one index; and writing data into the memory by the electronic card interface in response to the user interaction, the data recording an occurrence of the user interaction with the at least one index.

8. An electronic card being insertable in an electronic card interface, the electronic card interface having a substantially transparent surface and means for detecting a user interaction with an area on the surface, said electronic card comprising:

a substrate with at least one index visible through the surface; and memory for storing first data readable by the electronic card interface and used by the electronic card interface for writing second data into said memory in response to the user interaction, the second data prescribing a function associated with the at least one index upon subsequent interaction with the area on the surface associated with the at least one index.

9. An electronic card according to claim 8, wherein, upon subsequent interaction with the area on the surface associated with said at least one index, the second data is read by the electronic card interface from said memory and the function is performed by the electronic card interface.

10. An electronic card according to claim 8, wherein the function is directing a computer application in communication with the electronic card interface to a state associated with a state of the application when the user interaction occurred.

11. An electronic card according to claim 8, wherein the function is directing a World Wide Web browser in communication with the electronic card interface to a World Wide Web page associated with data displayed on a screen of an information appliance when the user interaction occurred.

12. An electronic card according to claim 8, wherein the function is returning an information appliance in communication with the electronic card interface to a state of the information appliance when the user interaction occurred.

13. An electronic card according to claim 8, wherein the data is written into a volatile portion of said memory.

14. An electronic card being insertable in an electronic card interface having a substantially transparent surface, the electronic card interface having means for detecting a user interaction with an area on the surface, said electronic card comprising:

a substrate with at least one index visible through the surface; and memory for storing first data readable by the electronic card interface and used by the electronic card interface for writing second data into said memory in response to the user interaction, the second data recording an occurrence of the user interaction with said at least one index.

15. An electronic card insertable in an electronic card interface, the electronic card interface having a substantially transparent surface and means for detecting a user interaction with an area on the surface, said electronic card comprising:

a substrate with at least one index visible through the surface; and memory for storing first data readable by the electronic card interface and used by the electronic card interface for writing second data into said memory in response to the user interaction, the second data recording a current condition of a device connected to the electronic card interface at an instance of the user interaction with said at least one index.

16. An electronic card system comprising:

an information appliance;

an electronic card comprising a substrate with at least one index and a memory; and an electronic card interface in communication with said information appliance and for receiving said electronic card, said electronic card interface comprising:

(a) a substantially transparent surface through which said at least one index of said electronic card is visible;

(b) means for detecting a user interaction with an area on the surface associated with said at least one index; and (c) means for writing data into said memory in response to the user interaction, the data prescribing a function performed by said information appliance and associated with said at least one index upon subsequent interaction with the area on said surface associated with said at least one index.

17. An electronic card system according to claim 16, wherein upon subsequent interaction with the area on the surface associated with the at least one index, the data is read from said memory by said electronic card interface and communicated to said information appliance.

18. An electronic card according to claim 16, wherein the function is directing a computer application executing on said information appliance to a state associated with a state of the application when the user interaction occurred.

19. An electronic card system comprising:

an electronic card comprising a substrate with at least one index and a memory; and an electronic card interface for receiving said electronic card, said electronic card interface comprising:

(a) a substantially transparent surface through which said at least one index of said electronic card is visible;

(b) means for detecting a user interaction with an area on said surface associated with said at least one index; and (c) means for writing data into said memory in response to the user interaction, the data recording an occurrence of the user interaction with said at least one index.

20. An electronic card system comprising:

an electronic card comprising a substrate with at least one index and a memory; and an electronic card interface for receiving said electronic card, said electronic card interface comprising:

(a) a substantially transparent surface through which said at least one index of said electronic card is visible;

(b) means for detecting a user interaction with an area on said surface associated with said at least one index; and (c) means for writing data into said memory, the data recording a condition of a device connected to said electronic card interface at an instance of the user interaction with said at least one index.

\* \* \* \* \*